US008000513B2

(12) United States Patent
Defrise et al.

(10) Patent No.: US 8,000,513 B2
(45) Date of Patent: Aug. 16, 2011

(54) SYSTEM AND METHOD FOR 3D TIME OF FLIGHT PET FORWARD PROJECTION BASED ON AN EXACT AXIAL INVERSE REBINNING RELATION IN FOURIER SPACE

(75) Inventors: Michel Defrise, Brussels (BE); Vladimir Y. Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 90 days.

(21) Appl. No.: 12/564,358

(22) Filed: Sep. 22, 2009

(65) Prior Publication Data
US 2010/0074500 A1    Mar. 25, 2010

Related U.S. Application Data

(60) Provisional application No. 61/099,016, filed on Sep. 22, 2008.

(51) Int. Cl.
*G06K 9/00* (2006.01)
(52) U.S. Cl. .................. 382/132; 382/131; 382/128
(58) Field of Classification Search .................. 382/128, 382/131, 132, 280; 250/363.04, 363.03
See application file for complete search history.

(56) References Cited

U.S. PATENT DOCUMENTS

| | | | |
|---|---|---|---|
| 2007/0036418 A1* | 2/2007 | Pan et al. ........................ | 382/131 |
| 2008/0099686 A1 | 5/2008 | Defrise et al. | |
| 2008/0217540 A1 | 9/2008 | Panin et al. | |

OTHER PUBLICATIONS

Michel Defrise et al., Exact and Approximate Rebinning Algorithms for 3D PET data, IEEE transactions on medical imaging, vol. 16, No. 2, Apr. 1997.*

A. Alessio, P. Kinahan, T. Lewellen, "Modeling and incorporation of system response functions in 3D whole body PET", IEEE Trans. Med. Imag., vol. 25, pp. 828-837, 2006.
S. Cho Q. Li, S. Ahn, and R.M Leahy, "Iterative Image Reconstruction Using Inverse Fourier Rebinning for Fully 3-D PET," IEEE Trans. Med. Imag., vol. 26, pp. 745-756, 2007.
S. Cho, S. Ahn, Q. Li and R. Leahy, "Exact and approximate Fourier rebinning of PET data from time-of-flight to non time-of-flight", Phys. Med. Biol., vol. 54. pp. 467-484, 2009.
M. Defrise, C. Michel, M. Casey and M. Conti, "Fourier rebinning of time-of-flight PET data," Phys. Med. Biol., vol. 50, pp. 2749-2763, 2005.
M. Defrise, V. Panin, C. Michel, M. Casey, "Continuous and Discrete Data Rebinning in Time-of-Flight PET", IEEE Trans. Med. Imag., vol. 27, pp. 1310-1322, 2008.

(Continued)

*Primary Examiner* — Vu Le
*Assistant Examiner* — Claire Wang
(74) *Attorney, Agent, or Firm* — Peter L. Kendall

(57) ABSTRACT

Methods and systems for reconstructing a nuclear medical image from time-of-flight (TOF) positron emission tomography (PET) imaging data are disclosed. Measured three-dimensional (3D) TOF-PET data, including direct two-dimensional (2D) projections and oblique 3D projection data, are acquired from a PET scanner. A model 3D image is preset, a modeled 2D TOF sinogram is generated from the model 3D image, and a modeled 3D TOF sinogram is generated from the 2D TOF sinogram based on an exact inverse rebinning relation in Fourier space. The model 3D image is corrected based on the 3D TOF sinogram and is provided as the reconstructed nuclear medical image. Techniques disclosed herein are useful for facilitating efficient medical imaging, e.g., for diagnosis of various bodily conditions.

20 Claims, 14 Drawing Sheets

OTHER PUBLICATIONS

P.M. Joseph, "An improved algorithm for reprojecting rays through pixel images," IEEE Trans. Med. Imag., vol. 1, pp. 192-196, 1982.

X. Liu, M. Defrise, P.E. Kinahan, C. Michel, M. Sibomana, and D. Townsend, "Exact rebinning methods for 3D PET," IEEE Trans. Med. Img., vol. 18, pp. 657-664, 1999.

N. A. Mullani, W. H. Wong, R. Hartz. K. Yerian, A. Philippe and K. L. Gould, "Sensitivity improvement of TOF PET by the utilization of the inter-slice coincidences," IEEE Trans. Nucl. Sci., vol. 29, pp. 479-483, 1982.

J. Nuyts, S. Stroobants. P. Dupont. S. Vleugels, P. Flamen, and L. Mortelmans, "Reducing Loss of Image Quality Because of the Attenuation Artifact in Uncorrected PET Whole-Body Images," J. Nucl. Med., vol. 43, pp. 1054-1062, 2002.

V.Y. Panin and M. Defrise, "3D TOF PET Forward Projector Based on Axial Consistency Conditions," Proc. Fully 3D meeting, pp. 277-280, 2007.

A. Reader, P.J. Julyan, H. Williams, D.L. Hastings, and J. Zweit, "EM Algorithm System Modeling by Image-Space Techniques for PET Reconstruction," IEEE Trans. Nucl. Sci., vol. 50, pp. 1392-1397, 2003.

D.L. Snyder and D.G. Politte, "Image reconstruction from list-mode data in an emission tomography system having time-of-flight measurements," IEEE Trans. Nucl. Sci., vol. 30, pp. 1843-1849, 1983.

S. Vandenberghe, M. E. Daube-Witherspoon, R.M. Lewitt, and J. S. Karp, "Fast reconstruction of 3D TOF PET data by axial rebinning and transverse mashing," Phys. Med. Biol., vol. 51, 1603-1621, 2006.

* cited by examiner

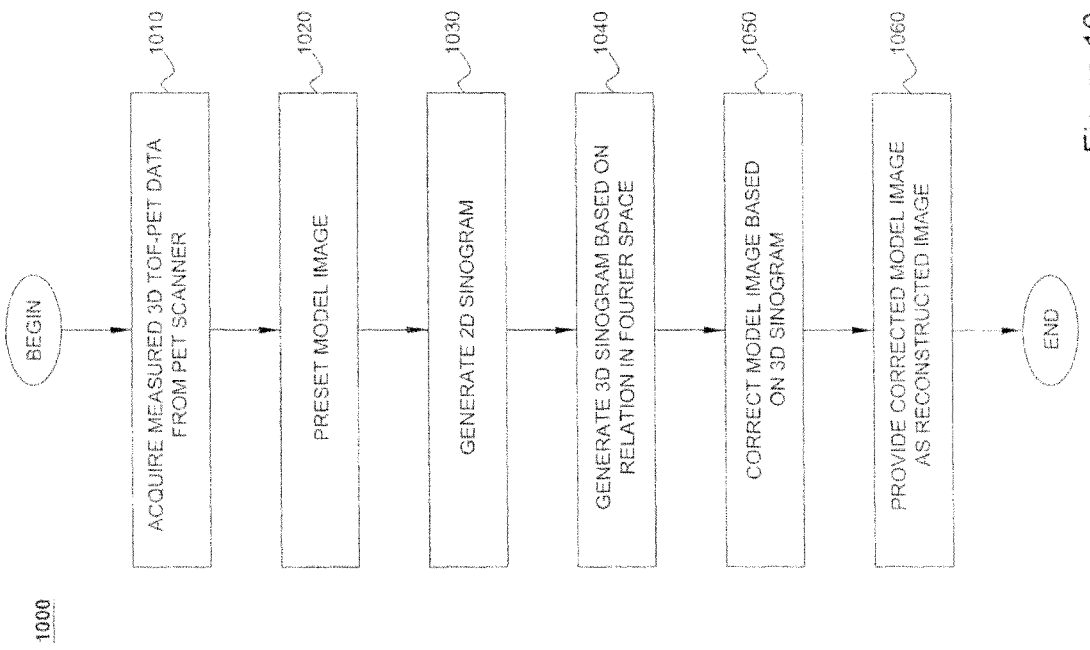

SYSTEM AND METHOD FOR 3D TIME OF FLIGHT PET FORWARD PROJECTION BASED ON AN EXACT AXIAL INVERSE REBINNING RELATION IN FOURIER SPACE

CROSS-REFERENCE TO RELATED APPLICATIONS

This application claims priority under 35 U.S.C. §119(e) from copending Provisional Application Ser. No. 61/099,016, filed Sep. 22, 2008.

BACKGROUND

Positron Emission Tomography (PET) is a nuclear medicine technique that is used to produce images for diagnosing the biochemistry or physiology of a specific organ, tumor, or other metabolically active site of the body.

FIG. 1 shows an example PET system. General information about PET imaging may be found in copending U.S. patent application Ser. No. 11/804,265 by Defrise et al. U.S. patent application Ser. No. 11/716,358 by Panin et al., both of which are hereby incorporated herein by reference in their entirety. A positron-emitting radioisotope 6 is introduced into the body 4 on a metabolically active molecule. When a positron encounters an electron, both are annihilated, yielding two gamma photons that travel in approximately opposite directions. A gantry 3 detects pairs of gamma rays 7 resulting from such annihilation events. The gantry 3 comprises a plurality of rings, with each ring comprising multiple scintillator crystals 8 and associated radiation detectors 5. Annihilation events are typically identified by a time coincidence between the detection of the two gamma photons by two oppositely disposed detectors, i.e., the gamma photon emissions are detected virtually simultaneously by each detector. When two oppositely traveling gamma photons strike corresponding oppositely disposed detectors to produce a time coincidence event, the photons identify a line of response (LOR) along which the annihilation event has occurred.

Images of metabolic activity in space are reconstructed by computer analysis. A processing unit (event detection unit) 1 determines and evaluates coincidence events generated by the pair of gamma rays and forwards this information to an image processing unit (computational unit) 2. Detector pairs associated to each line of response (LOR) produce many (e.g., millions of) coincidence events during a measurement.

FIG. 2 shows the conceptual basis for two-dimensional (2D) sinograms that are used for imaging. A sinogram 100 shows integrations along parallel LORs through all angles $\Phi$, as shown on the left side of FIG. 2. The horizontal axis of the sinogram 100 represents distances on the projection axis s, and the vertical axis represents the different angles $\Phi$ of the projection of the scanned object f(x, y). The result of integrating along a particular LOR (i.e., for a particular value s and a particular angle $\Phi$) is typically indicated by an intensity of a point in the s-$\Phi$ plane of the sinogram 100. For a given angle $\Phi$, the result of integrating along various parallel LORs (i.e., varying s) yields a line in the s-$\Phi$ plane (with varying intensity at different points on the line), shown illustratively (not shown to scale in intensity) by a horizontal line in the sinogram 100. A single point 110 in the object 4 being defined by f(x, y) would thus be represented as a sinusoid in the sinogram 100 across varying angles $\Phi$, as indicated by the dotted arrow.

FIG. 3 shows two different types of measurements into which coincidence events can be divided. The different types of measurements are based on the third dimension (z-axis) added by the plurality of rings in the gantry 3. In a 2D mode, the detectors 210 of the various rings are separated septa 220. Thus, in this mode, the scanner only collects coincidence events in direct planes 230 and cross planes 240, which are organized into direct planes. In a 3D mode, the scanner collects data from coincidence events that take place in all or most of the oblique planes 250. Each coincidence event depends on the particular location where the above described reaction took place and the pair of gamma photon was generated. Each gamma photon pair is therefore subject to location-dependent attenuation, resulting in projection data. PET data can be characterized to comprise direct (2D) and indirect (3D, also referred to as oblique) projection data.

In addition, modern PET systems may measure not only the attenuation but also the time of flight (TOF) of photons corresponding to a coincidence event, i.e., the time required for a photon to travel from its point of origin to the point of detection. TOF is dependent upon the speed of light c and the distance traveled. A time coincidence, or coincidence event, is identified if the time difference between the arrival of signals at a pair of oppositely disposed detectors is less than a coincidence time threshold $\tau$.

FIG. 4 shows the conceptual basis of time of flight (TOF) determination. As illustrated in FIG. 4, if an annihilation event occurs at the midpoint of a LOR, the TOF of the gamma photon detected in detector A (TOF_A) is equal to the TOF of the gamma photon detected in detector B (TOF_B). If an annihilation event occurs at a distance $\Delta x$ from the midpoint of the LOR, the difference between TOF_A and TOF_B is $\Delta t = 2\Delta x/c$, where c is the speed of light. If d is the distance between the detectors, the TOF difference $\Delta t$ could take any value from $-d/c$ to $+d/c$, depending on the location of the annihilation event.

According to the principles of TOF positron emission tomography (TOF-PET), measurement of the difference $\Delta t$ between the detection times of the two gamma photons arising from the positron annihilation event allows the annihilation event to be localized along the LOR with a resolution of about 75-120 mm corresponding to full width at half maximum (FWHM), assuming a time resolution of 500-800 picoseconds (ps). Though less accurate than the spatial resolution of the scanner, this approximate localization is effective in reducing the random coincidence rate and in improving both the stability of the reconstruction and the signal-to-noise ratio (SNR), especially when imaging large objects.

TOF acquisition results in additional data dimensions that significantly increase data size. One practical existing approach is called list mode reconstruction (see D. L. Snyder and D. G. Politte, "Image reconstruction from list-mode data in an emission tomography system having time-of-flight measurements," *IEEE Trans. Nucl. Sci.*, vol. 30, pp. 1843-1849, 1983"). However, list mode reconstruction depends on the number of registered events and therefore is time consuming for high count studies. In addition, list-mode reconstruction is only possible with certain algorithms. An alternative solution exploits the redundancy of TOF information to compress data without loss of resolution (see S. Vandenberghe, M. E. Daube-Witherspoon, R. M. Lewitt and J. S. Karp, "Fast reconstruction of 3D TOF PET data by axial rebinning and transverse mashing," *Phys. Med. Biol.*, vol. 51, 1603-1621, 2006). Such compression may consist of axial rebinning and azimuthal mashing, resulting in histogrammed data that can be reconstructed using any algorithm and in a manner that is independent of the acquisition time.

Prior art methods based on Fourier transforms use redundancy to rebin a 3D data set into 2D data, similarly to what is done for non-TOF PET data (see M. Defrise, C. Michel, M. Casey and M. Conti, "Fourier rebinning of time-of-flight PET data," *Phys. Med. Biol.*, vol. 50, pp. 2749-2763, 2005 and S. Cho, S. Ahn, Q. Li and R. Leahy, "Exact and approximate Fourier rebinning of PET data from time-of-flight to non time-of-flight", *Phys. Med. Biol.*, vol. 54, pp. 467-484, 2009). A disadvantage of the Fourier methods is the necessity to synthesize missing data due for example to gaps between blocks. In addition, these methods assume a parallel beam data organization, which is not natural for a cylindrical scanner. Pure axial rebinning methods exist for TOF data, such as Single Slice Rebinning (TOF-SSRB) (see N. A. Mullani, W. H. Wong, R. Hartz, K. Yerian, A. Philippe and K. L. Gould, "Sensitivity improvement of TOF PET by the utilization of the inter-slice coincidences," *IEEE Trans. Nucl. Sci.*, vol. 29, pp. 479-83, 1982). Such rebinning is performed independently for each azimuthal and radial coordinates and is suitable for LOR data. Recently, an exact axial rebinning for TOF data was derived, based on Consistency Conditions (CCs), which generalize John's equation. Unfortunately, these CCs contain second order derivatives of the measured data, resulting in noise amplification during rebinning. This fact led to the investigation of a generalized rebinning with a noise-resolution tradeoff property (see M. Defrise, V. Panin, C. Michel, M. Casey, "Continuous and Discrete Data Rebinning in Time-of-Flight PET", *IEEE Trans. Med. Imag.*, vol. 27, pp. 1310-1322, 2008). 3D reconstruction is more expensive in terms of time and resources than the rebinned based methods but advantageously allows accurate statistical modeling.

The Fourier transform based inverse rebinning methods in (X. Liu, M. Defrise, P. E. Kinahan, C. Michel, M. Sibomana, and D. Townsend, "Exact rebinning methods for 3D PET," *IEEE Trans. Med. Img.*, vol. 18, pp. 657-664, 1999) and (S. Cho, Q. Li, S. Ahn, and R. M Leahy, "Iterative Image Reconstruction Using Inverse Fourier Rebinning for Fully 3-D PET," *IEEE Trans. Med. Imag.*, vol. 26, pp. 745-756, 2007) allow fast forward projection of non-TOF data in a parallel beam geometry. In addition, these methods permit point spread function (PSF) modeling despite being based on the line integral model that is implied by the Fourier relations (see A. Reader, P. J. Julyan, H. Williams, D. L. Hastings, and J. Zweit, "EM Algorithm System Modeling by Image-Space Techniques for PET Reconstruction," *IEEE Trans. Nucl. Sci.*, vol. 50, pp 1392-1397, 2003 and A. Alessio, P. Kinahan, T. Lewellen, "Modeling and incorporation of system response functions in 3D whole body PET", *IEEE Trans. Med. Imag.*, vol. 25, pp. 828-837, 2006). The accuracy of the Fourier methods, however, depends on having a fine sampling of the 3D data. The method in the Liu et al. reference, in particular, disadvantageously requires a fine azimuthal sampling, which is incompatible with the ordered subsets (OS) iterative methods, where each data subset is significantly undersampled.

SUMMARY

According to an embodiment, disclosed is a method for reconstructing a nuclear medical image from time-of-flight (TOF) positron emission tomography (PET) imaging data. Measured three-dimensional (3D) TOF-PET data, including direct two-dimensional (2D) projections and oblique 3D projection data, are acquired from a PET scanner. The 3D TOF-PET data are represented by the following parameterization:

$$p(t, r, \phi, z, \delta) = \sqrt{1+\delta^2} \int_{-\infty}^{\infty} dl\, h(t - l\sqrt{1+\delta^2}) \times f\begin{pmatrix} r\cos\phi - l\sin\phi, \\ r\sin\phi + l\cos\phi, \\ z + l\delta \end{pmatrix}.$$

A model 3D image is preset. A modeled 2D TOF sinogram is generated from the model 3D image, and a modeled 3D TOF sinogram is generated from the 2D TOF sinogram based on the following relation in Fourier space:

$$\hat{p}(\mu, \nu, \delta) = \sqrt{1+\delta^2} \frac{\hat{h}(\mu)}{\hat{h}(\mu\sqrt{1+\delta^2} - \nu\delta)} \hat{p}(\mu\sqrt{1+\delta^2} - \nu\delta, \nu, 0).$$

The model 3D image is corrected based on the 3D TOF sinogram and is provided as the reconstructed nuclear medical image.

Another embodiment is a PET system including a gantry, an event detection unit, and a computational unit configured to perform the operations above regarding the method for reconstructing a nuclear medical image from TOF-PET imaging data.

Another embodiment is a computer readable medium having instructions stored thereon. When executed by a processor, the instructions cause the processor to perform the operations described above regarding the method for reconstructing a nuclear medical image from TOF-PET imaging data.

BRIEF DESCRIPTION OF THE DRAWINGS

The following will be apparent from elements of the figures, which are provided for illustrative purposes and are not necessarily to scale.

FIG. 10 is a flow chart of a process according to an embodiment.

DETAILED DESCRIPTION

All references cited herein are hereby incorporated by reference in their entirety.

Figure 1:
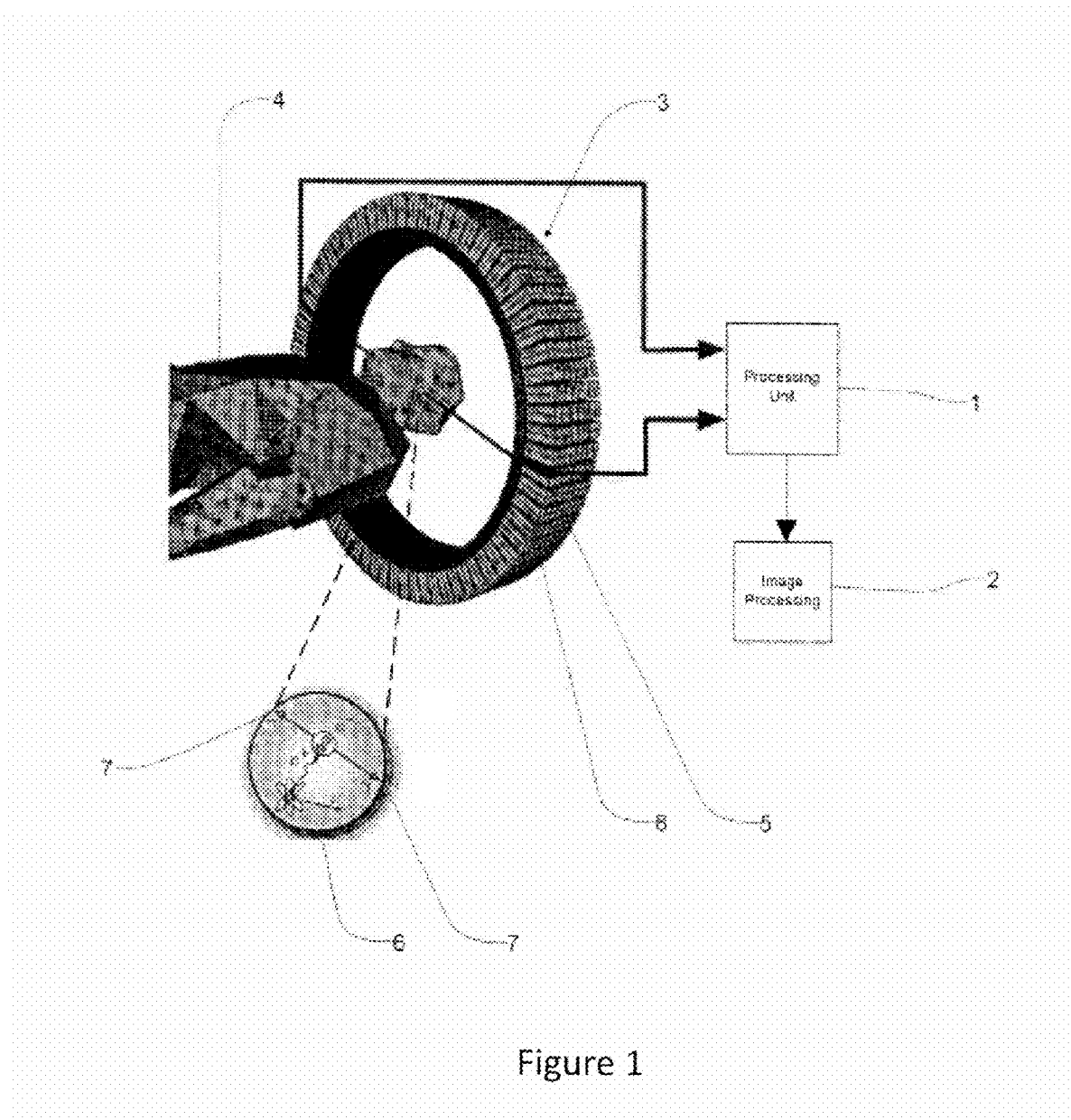
FIG. 1 is an illustration of a PET system.
Figure 2:
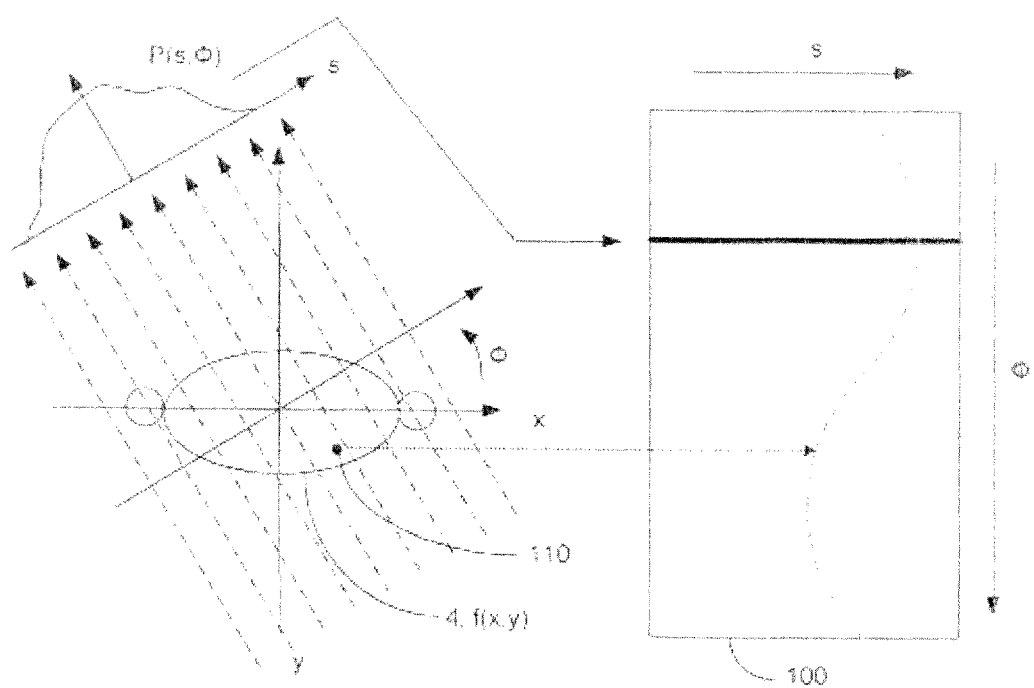
FIG. 2 is a conceptual diagram of a 2D sinogram.
Figure 3:
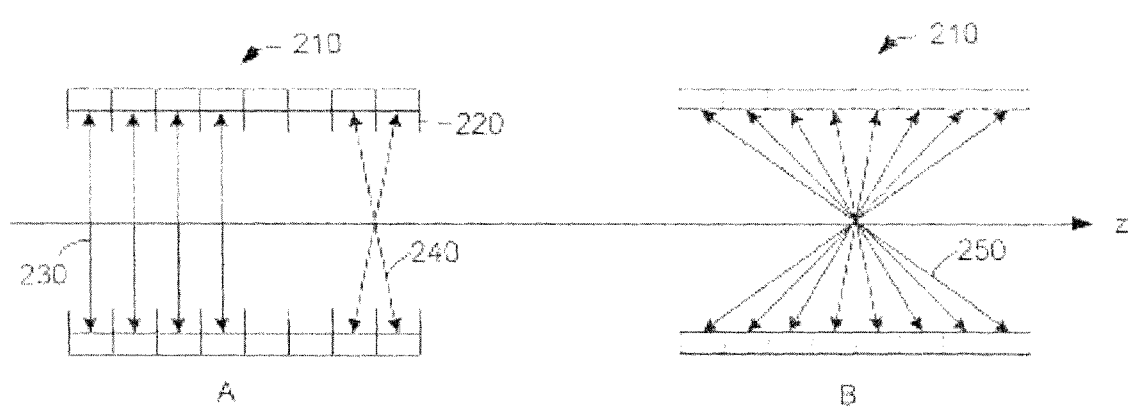
FIG. 3 is a conceptual diagram of two different types of measurements into which coincidence events can be divided.
Figure 4:
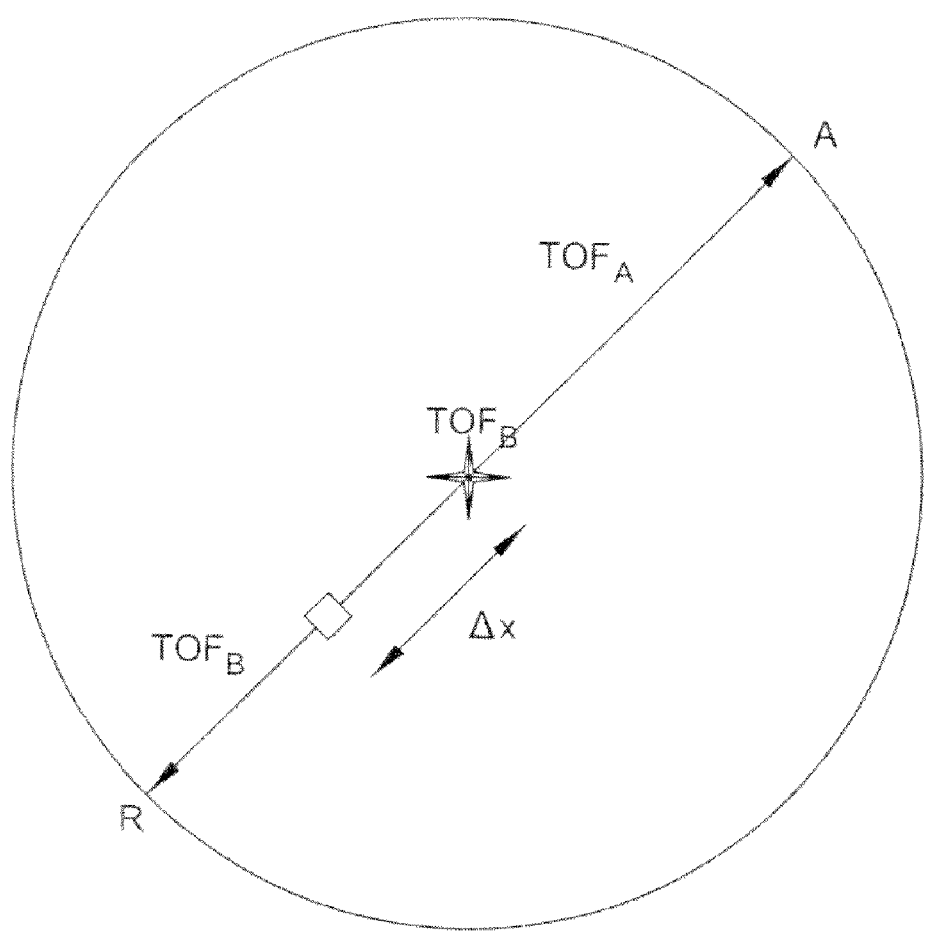
FIG. 4 is a conceptual diagram showing time of flight (TOF) determination according to an embodiment.
Figure 5:
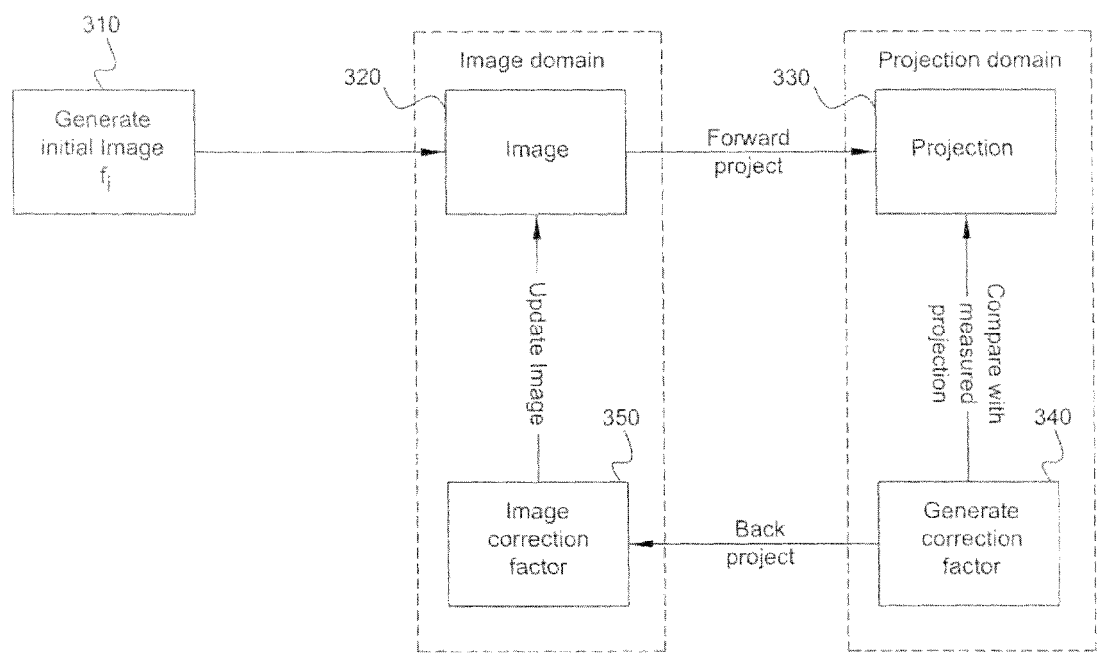
FIG. 5 is a flow chart for an iterative process according to an embodiment.

FIG. 5 is a flow chart for an iterative process according to an embodiment. Iterative image reconstruction starts with an initial model image 310 as shown in FIG. 5. This preset image, which is a 3D image in an embodiment, is then used as part of an iterative technique (320). Various projections/sinograms of this image are calculated to generate respective model image projections (330). Then, these model image projections/sinograms are compared with the actual measured projections/sinograms, and correction factors are determined for each projection/sinogram (340). As part of the box marked "Projection" (330) in FIG. 5, a new 3D (oblique) projection/sinogram technique is provided. The new 3D sinogram technique is based on a relation in Fourier space that is described further below. The correction factors are then backprojected using a back-projector to form image correction factors (350). These image correction factors are then used to alter/adapt the image 320 used previously, i.e., making the approach iterative. In an embodiment, this iterative process is repeated until the correction factors are below a predetermined threshold value.

Prior art TOF projectors are commonly implemented using a line integral through an image, taking into account voxel contribution to TOF bins. In the present disclosure, an alternative approach is described. Oblique (indirect, 3D) sinograms are computed from 2D direct projection data using an exact inverse rebinning relation in Fourier space. This relation formulates TOF data connections separately for each radial and azimuthal coordinate. This makes it attractive for image mapping into the LOR space and for use in ordered subset (OS) reconstruction. Further mathematical details of the relation are provided later below.

TOF information adds a dimension beyond spatial dimensions. Thus, two-dimensional projections comprise three dimensions, and three-dimensional projections comprise four dimensions. To this end, in an embodiment, model TOF information is determined as a line integral of an image with weights that describe the TOF resolution. These weights depend on the distance from center of field of view and are specific for each TOF bin. Similarly, the measured image projections comprise the direct (2D) and oblique (3D) projections (as explained above) and, in addition, measured TOF information that may be organized in respective TOF bins associated with each projection. The model calculation used for comparison therefore provides for the same type of projection data. The number of TOF bins used depends on the design of the system. Results using differently sized TOF bins will be discussed below. However, the numbers of bins used in these examples are merely examples. The present embodiments are not restricted to any particular number of TOF bins.

Initially, the measured TOF data is parameterized as $$p(t, r, \phi, z, \delta) = \sqrt{1+\delta^2} \int_{-\infty}^{\infty} dl\, h(t - l\sqrt{1+\delta^2}) \times f(r\cos\phi - l\sin\phi, r\sin\phi + l\cos\phi, z + l\delta) \quad (1)$$

where f is the emission distribution, r the radial sinogram coordinate, Φ the azimuthal sinogram coordinate, z the axial coordinate of the mid-point of the LOR, and δ=tan θ is the tangent of the polar angle between the LOR and a transaxial plane. The TOF bin is denoted as t. A Gaussian TOF profile h(t)=exp(-t^2/2σ^2) is assumed, where σ is related to FWHM of the time difference measurement. So-called inverse axial rebinning generates a 3D TOF sinogram p(t, z, δ) from 2D TOF sinogram data p(t, z, 0) as follows.

Below, r and Φ are omitted in projection data notation, so f(r cos Ø−l sin Ø, r sin Ø+l cos Ø, z+lδ) is written as f(l, z) and p(t, r, Ø, z, δ) is written as p(t, z, δ), since the inverse rebinning is performed separately for each transaxial sinogram coordinate. Define the 2D Fourier transform with respect to t and z as $$\hat{f}(\mu, \nu) = (\mathfrak{I}\, f)(\mu, \nu) = \int_{-\infty}^{\infty} dt\exp(-2\pi it\mu) \int_{-\infty}^{\infty} dz\exp(-2\pi iz\nu) f(t, z) \quad (2)$$

and similarly $$\hat{p}(\mu, \nu, \delta) = (\mathfrak{I}\, p)(\mu, \nu, \delta) = \int_{-\infty}^{\infty} dt\exp(-2\pi it\mu) \int_{-\infty}^{\infty} dz\exp(-2\pi iz\nu) p(t, z, \delta). \quad (3)$$

The Fourier transform of (1) is then $$\hat{p}(\mu, \nu, \delta) = \sqrt{1+\delta^2} \int_{-\infty}^{\infty} dt\exp(-2\pi it\mu) \quad (4)$$
$$\int_{-\infty}^{\infty} dz\exp(-2\pi iz\nu) \int_{-\infty}^{\infty} dl\, f(l, z+l\delta) h(t - l\sqrt{1+\delta^2}) =$$
$$\sqrt{1+\delta^2} \int_{-\infty}^{\infty} dl\exp(-2\pi il\sqrt{1+\delta^2}\,\mu)$$
$$\int_{-\infty}^{\infty} dz\exp(-2\pi iz\nu) f(l, z+l\delta) \hat{h}(\mu) =$$
$$\sqrt{1+\delta^2}\, \hat{h}(\mu) \hat{f}(\mu\sqrt{1+\delta^2} - \nu\delta, \nu)$$

where $\hat{h}$ is the 1D Fourier transform of the TOF profile and $\hat{f}$ is the 2D Fourier transform of f(l, z).

Equation (4) is obtained by an additional Fourier transform with respect to r. To apply equation (4) to forward-projection, one first calculates the projections p(t, z, δ=0) using (1) with a standard discretization such as Joseph's method, which is a method known in the art for projecting rays through pixel images. Then the following expression, obtained by comparing (4) for δ=0 and δ≠0, $$\hat{p}(\mu, \nu, \delta) = \sqrt{1+\delta^2}\, \frac{\hat{h}(\mu)}{\hat{h}(\mu\sqrt{1+\delta^2} - \nu\delta)} \hat{p}(\mu\sqrt{1+\delta^2} - \nu\delta, \nu, 0) \quad (5)$$

is used to efficiently calculate the oblique (3D) projections. With a change of variables, (5) may be written (if desired) as:

$$\frac{1}{\sqrt{1+\delta^2}}\, \hat{p}\!\left(\frac{\mu+\nu\delta}{\sqrt{1+\delta^2}}, \nu, \delta\right) = \frac{\hat{h}\!\left((\mu+\nu\delta)/\sqrt{1+\delta^2}\right)}{\hat{h}(\mu)} \hat{p}(\mu, \nu, 0) \quad (6)$$

In each of (5) and (6), which are exact rebinning relations in Fourier space, the left hand side (δ≠0) corresponds to 3D and the right hand side (δ=0) to 2D. Thus, a 3D sinogram is generated from a 2D sinogram.

Best results for the presently disclosed approach have been found by implementing (5) in the time-axial frequency domain. The inverse Fourier transform of (5) with respect to μ is $$\hat{p}(t, \nu, \delta) = e^{2\pi it\frac{t\delta}{\sqrt{1+\delta^2}}} \int_{-\infty}^{\infty} dt'\, K(t', \nu) \hat{p}\!\left(\frac{t}{\sqrt{1+\delta^2}} - t', \nu, 0\right) \quad (7)$$

where $$K(t, \nu) = \int_{-\infty}^{\infty} d\mu\, e^{i2\pi\mu}\, \frac{\hat{h}\!\left((\mu+\nu\delta)/\sqrt{1+\delta^2}\right)}{\hat{h}(\mu)} W(\mu) \quad (8)$$

$$\hat{h}(\mu) = e^{-2\pi^2\sigma^2\mu^2},\quad W(\mu) = \begin{cases} 1, & |\mu| \le 1/2\Delta t \\ 0, & |\mu| > 1/2\Delta t \end{cases}$$

and where Δt is the TOF sampling interval. The low-pass window W is introduced because the TOF kernel K is a relatively broad Gaussian function, so that the projection data are assumed to be band-limited.

In an embodiment, the approximation $\sqrt{1+\delta^2}\approx 1$ allows implementation of (7) without needing to interpolate pÖ(t, ν, 0) in t. In an embodiment, the kernel K is sampled in the same way as the projection data. After convolving with K, the phase shift is applied, and an inverse 1D DFT is taken with respect to v to obtain the oblique (3D) sinogram. There is no need to regularize the ratio of the two $h^O(\mu)$ terms in (8), even though this ratio can be relatively large. The generation of the oblique (3D) sinogram by (7) is referred to as the inverse rebinning (IRB) method.

To verify the importance of the convolution kernel K, consider replacing it by the δ-function (impulse function): $K(t, v) \approx \delta(t)$. In this case, (7) is equivalent to the inverse single slice rebinning (ISSRB) method of (N. A. Mullani, W. H. Wong, R. Hartz, K. Yerian, A. Philippe and K. L. Gould, "Sensitivity improvement of TOF PET by the utilization of the inter-slice coincidences," *IEEE Trans. Nucl. Sci.*, vol. 29, pp. 479-83, 1982), because the phase shift is transferred to an axial shift after a discrete Fourier transform (DFT). The generation of oblique data by this method is extremely efficient but perhaps too approximate in case of wide TOF kernel and sparse TOF sampling. This projector is called the ISSRB projector.

Figure 6:
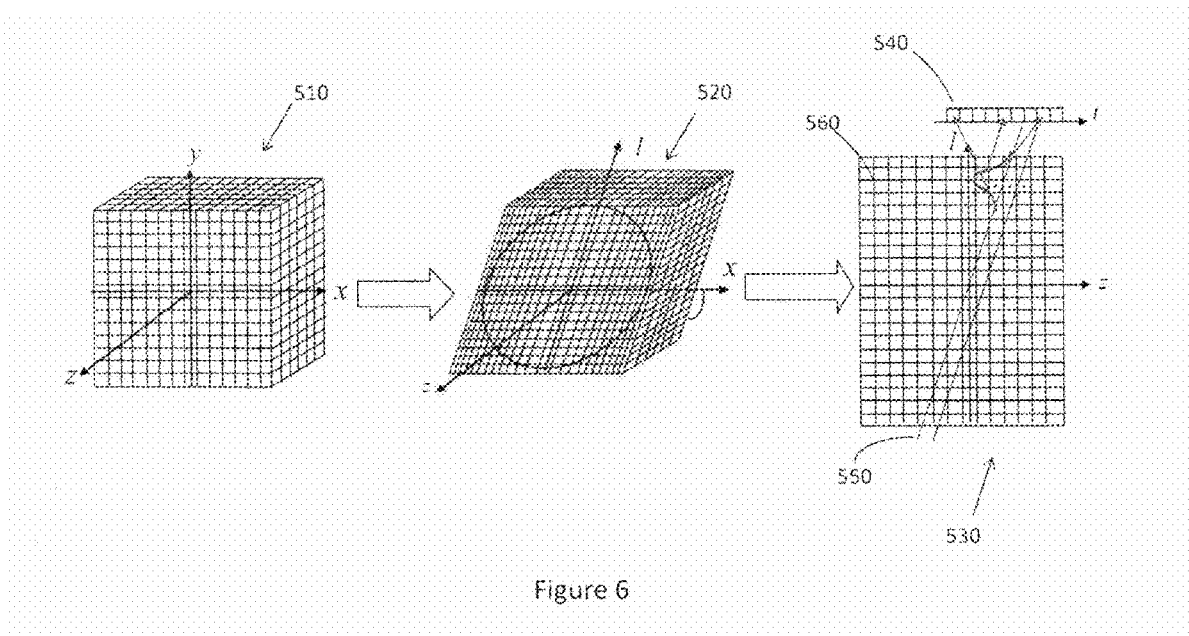
FIG. 6 shows line integration according to an embodiment.

The computational advantage of the IRB projector with respect to an efficient implementation of Joseph's projector can be understood from the following comparison. Referring to FIG. 6, to generate a 2D sinogram, Joseph's method performs a transverse 1D shearing of the original image in the x direction. The row dependent shearing traces non-equidistantly-sampled LORs for a given azimuthal angle. 2D projection data are computed by TOF summation over sheared image columns, along the depth dimension 1. In the 3D case, this transverse shearing is performed once for all oblique sinograms (i.e. for all δ). Then for each axial oblique LOR and TOF bin, Joseph's method computes the contribution from each axial row of the sheared image; this amounts to an additional axial row shearing.

One can conclude that the number of operations (for each r, Φ, δ) is proportional to $N_z N_t N_f$, where N is number of elements for each dimension. See FIG. 6 and equation (1). The number Nl is dependent on image FOV circular support and varies from Nx (image size transverse dimension) to 0. Thus, there are Nl contributions even if the LOR only traverses a smaller number of slices. The IRB projector starts from 2D data p(t, z, 0), where the dimension 1 has already been compressed. The number of operations is proportional to $N_t N_z \log N_z$ for the FFT and to $N_t^2 N_z$ for the convolution (7). Assuming the latter is normally dominant, the acceleration factor is proportional to the ratio $N_f/N_t$. This is a significant acceleration because, as will be shown below, a sparse TOF sampling of the direct projection data is enough to produce a good quality oblique sinogram. It should be mentioned that computer memory allocation of data can play a more important role than the number of floating point operations. The new IRB projector that is presently disclosed has an advantage in this respect, too, since the image, which is finely sampled in the depth 1 dimension, is not needed to produce an oblique sinogram.

The projector performance has been evaluated using simulated data for a cylindrical scanner, which was a Siemens TOF prototype scanner TrueV. The basic parameters are as follows: ring radius=434 mm; number of rings=55; max ring difference=38; max θ at FOV center and edge=7.40° (center), 10.50° (edge); image size=336×336×109 (2×2×2 mm); sinogram size (radial, azimuthal, axial)=(336, 336, 559); number of segments=7; planes per segment={109, 97, 75, 53}; <number TOF bins, width>=<15, 312 ps (46.8 mm)>; TOF FWHM=550 ps (82.5 mm). The projection data were assumed to be formed with span 11, where each histogrammed ("spanned") LOR is obtained by combining five of six LORs. The polar angle of the spanned LOR was set equal to the polar angle at the edge of the segment, where the spanned LOR corresponding to the last axial coordinate consists of only one LOR. Therefore the segment polar angle δ was independent of the axial coordinate z. However, it was dependent on the radial coordinate r due to cylindrical geometry. Practical sampling of TOF data was used for the simulation.

Figure 7:
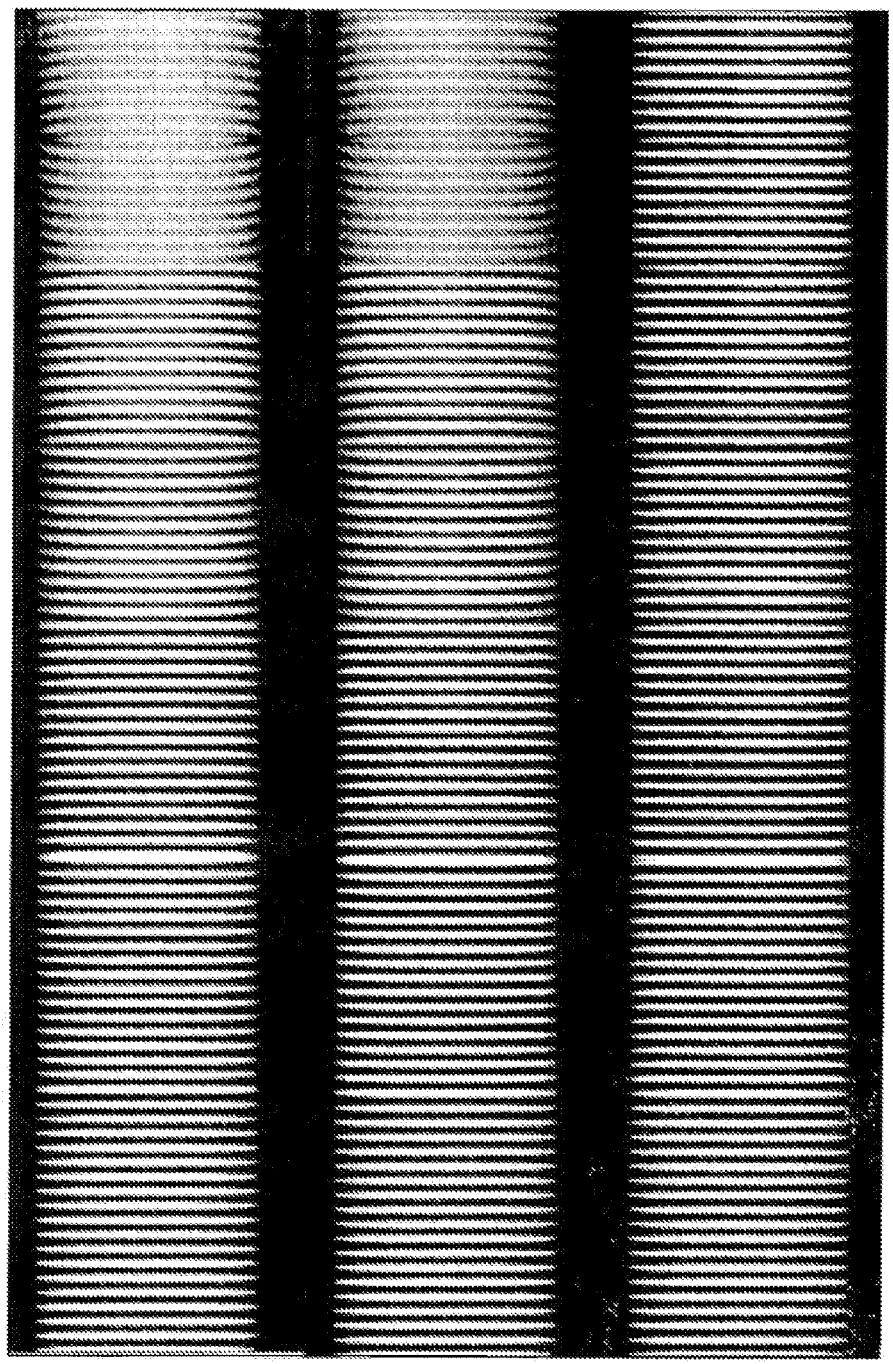
FIG. 7 is a simulation of a disc phantom in accordance with an embodiment.

Projection data were generated from a digitized image of the 20 cm diameter disc phantom of 6 plane period uniform disc values {1, 0.5, 0.25, 0, 0.25, 0.5}, placed at the center. Data were generated by Joseph's. IRB, and ISSRB projectors. The projectors mapped images into the span LOR space with non-equidistant radial sampling and with the correct dependence of the polar angle on the radial coordinate. The normalized root-mean-square (RMSE) difference between the output of the IRB and ISSRB projectors, and the output of Joseph's projector was computed for each projection plane; see FIGS. 7-8. As expected, the projections calculated using the exact IRB method are much closer (than those calculated using the ISSRB method) to the reference projections obtained using Joseph's projector. FIG. 7 shows one view and TOF bin+1 of the projection from the disc phantom. The top image is a projection generated by Joseph's method, the middle is a projection generated by IRB, and the bottom is a projection generated by ISSRB. The vertical axis represents the axial plane, and the horizontal axis represents the radial coordinate. Projections were truncated in the radial direction for display purposes.

Figure 8:
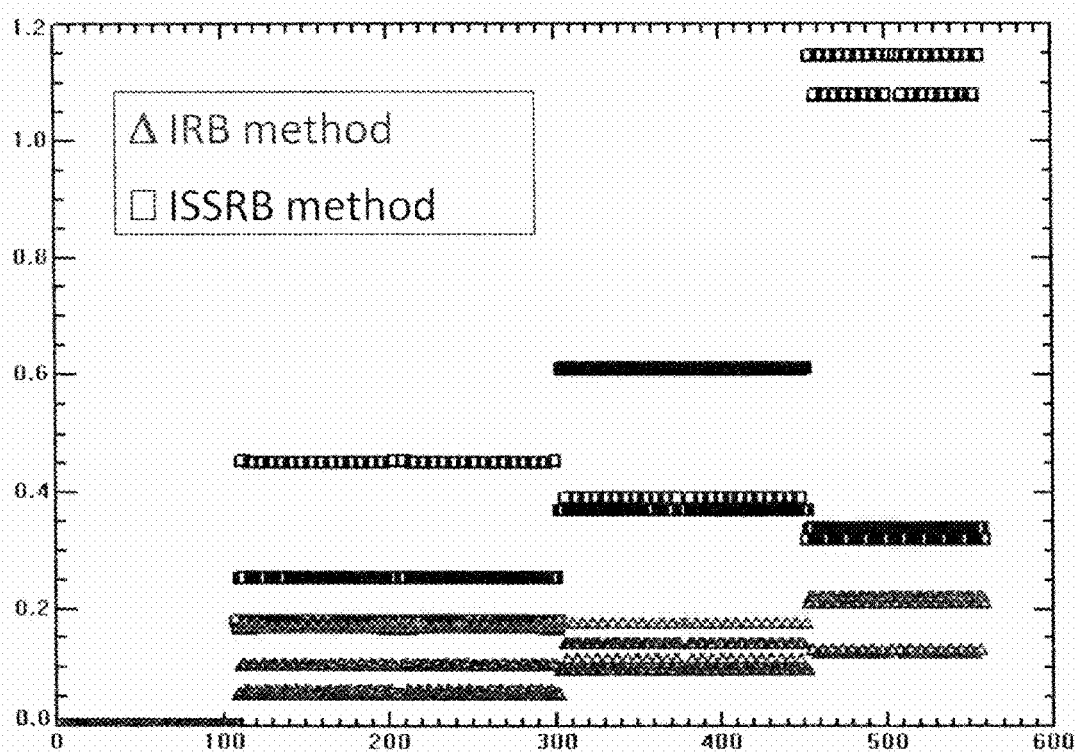
FIG. 8 is a plot showing performance according to an embodiment compared to a prior art approach called ISSRB.
Figure 9A:
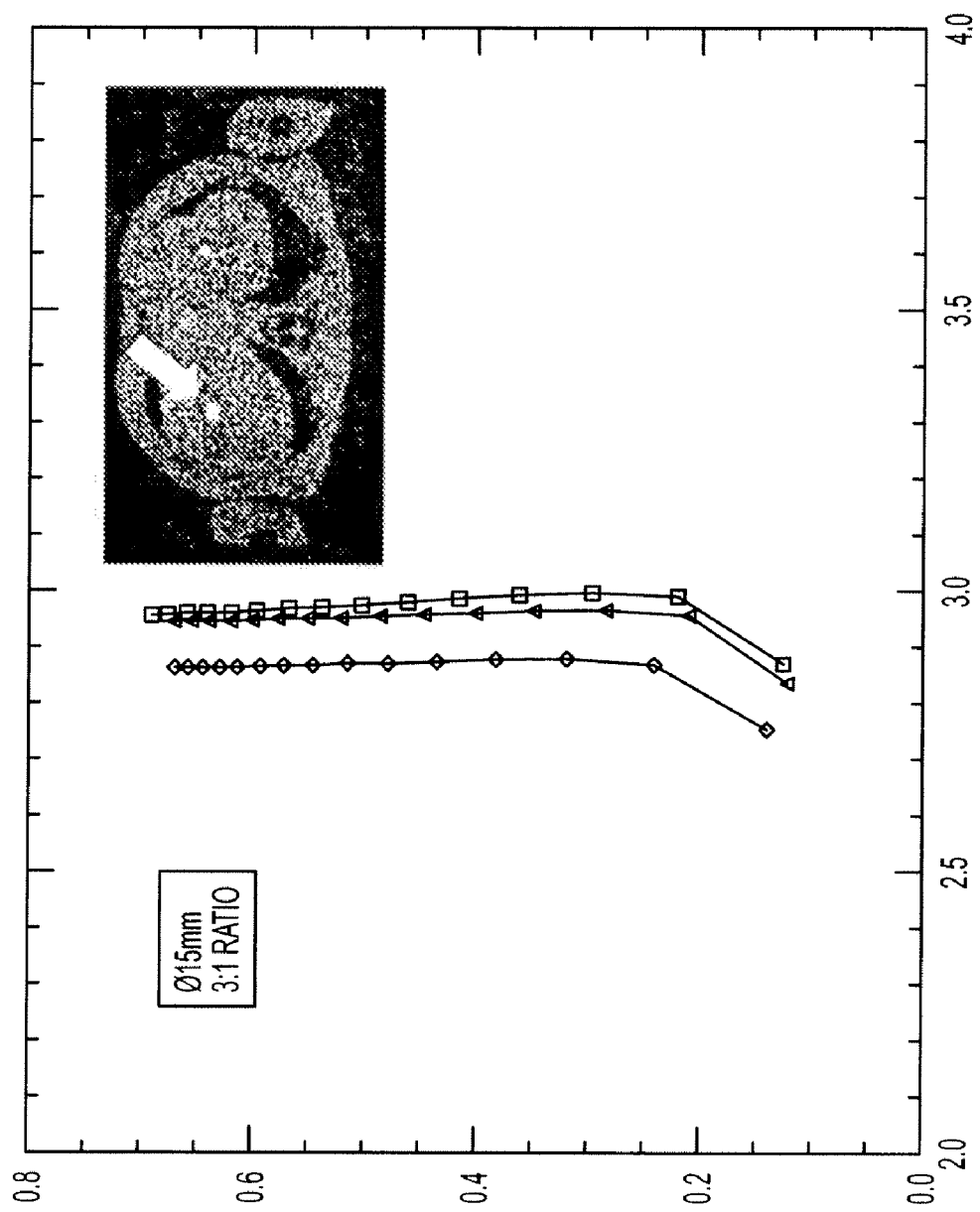
FIGS. 9A-9E are plots of reconstructions of a torso phantom according to an embodiment, along with noise-resolution tradeoff curves, for different conditions.
Figure 9B:
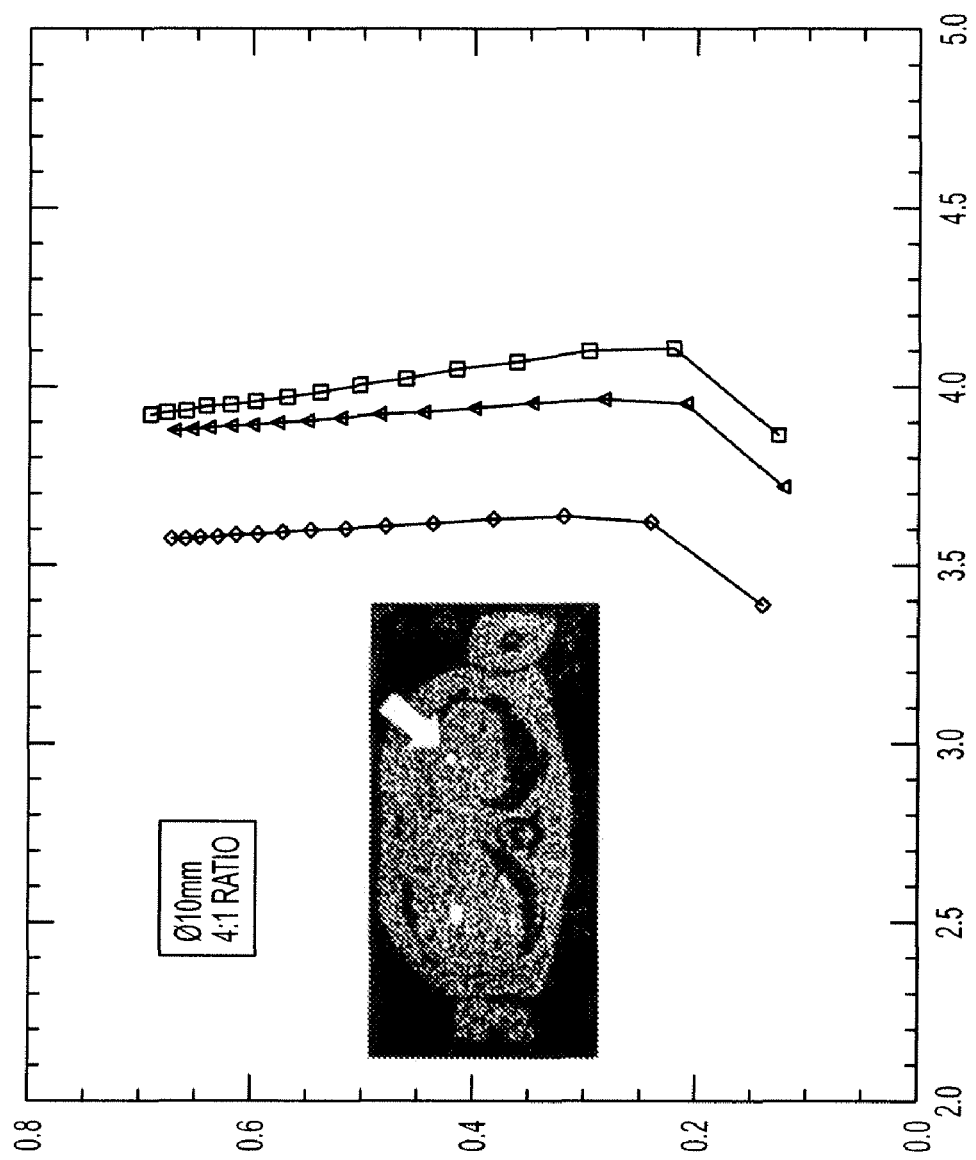
Figure 9C:
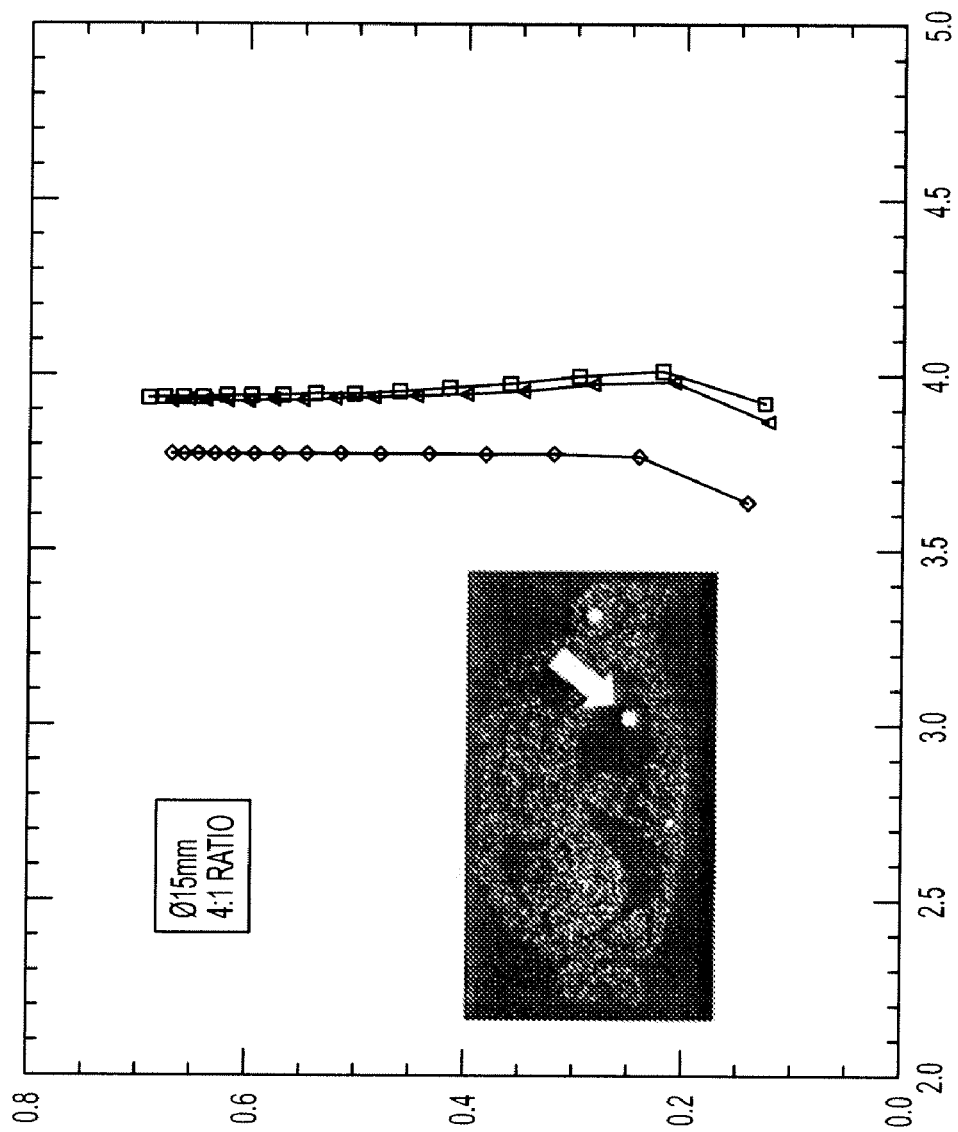
Figure 9D:
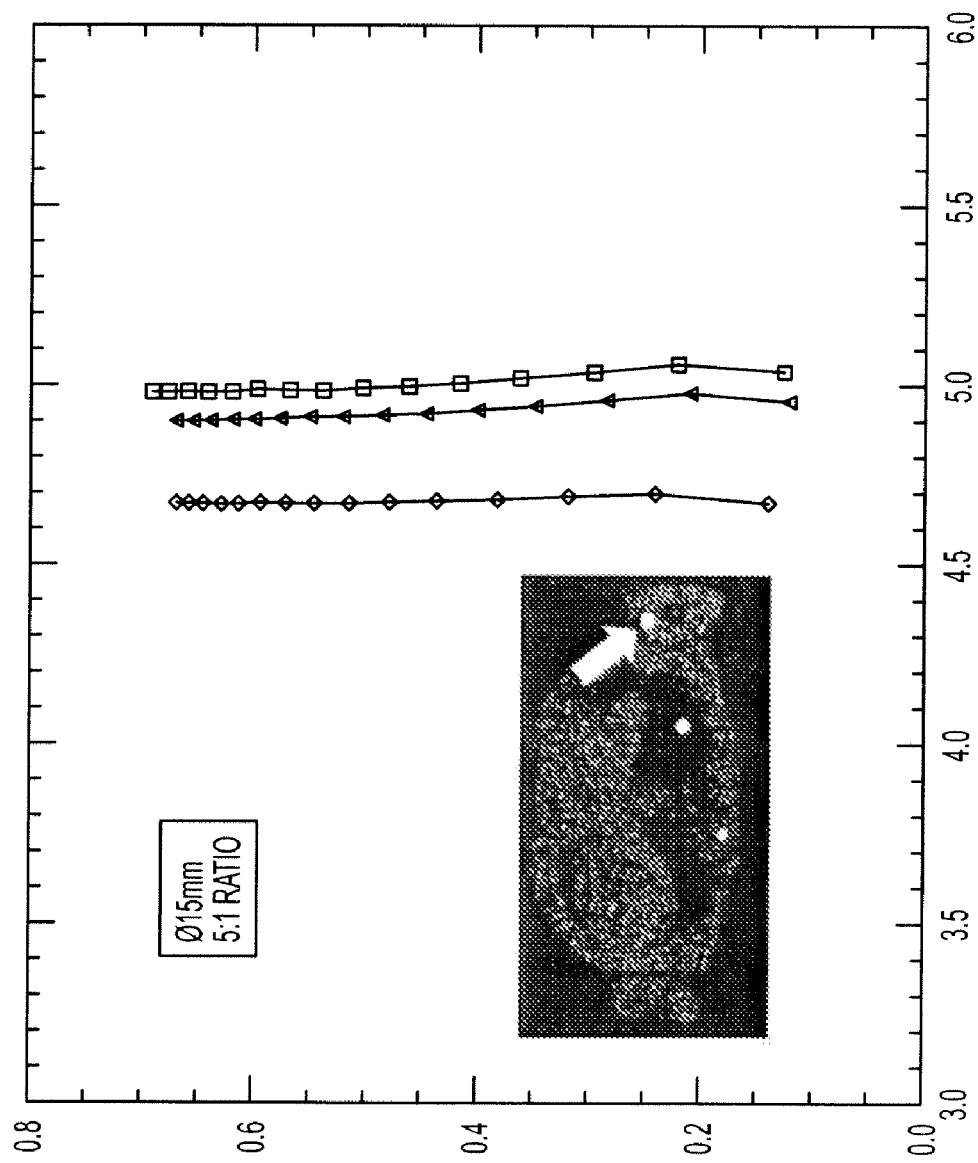
Figure 9E:
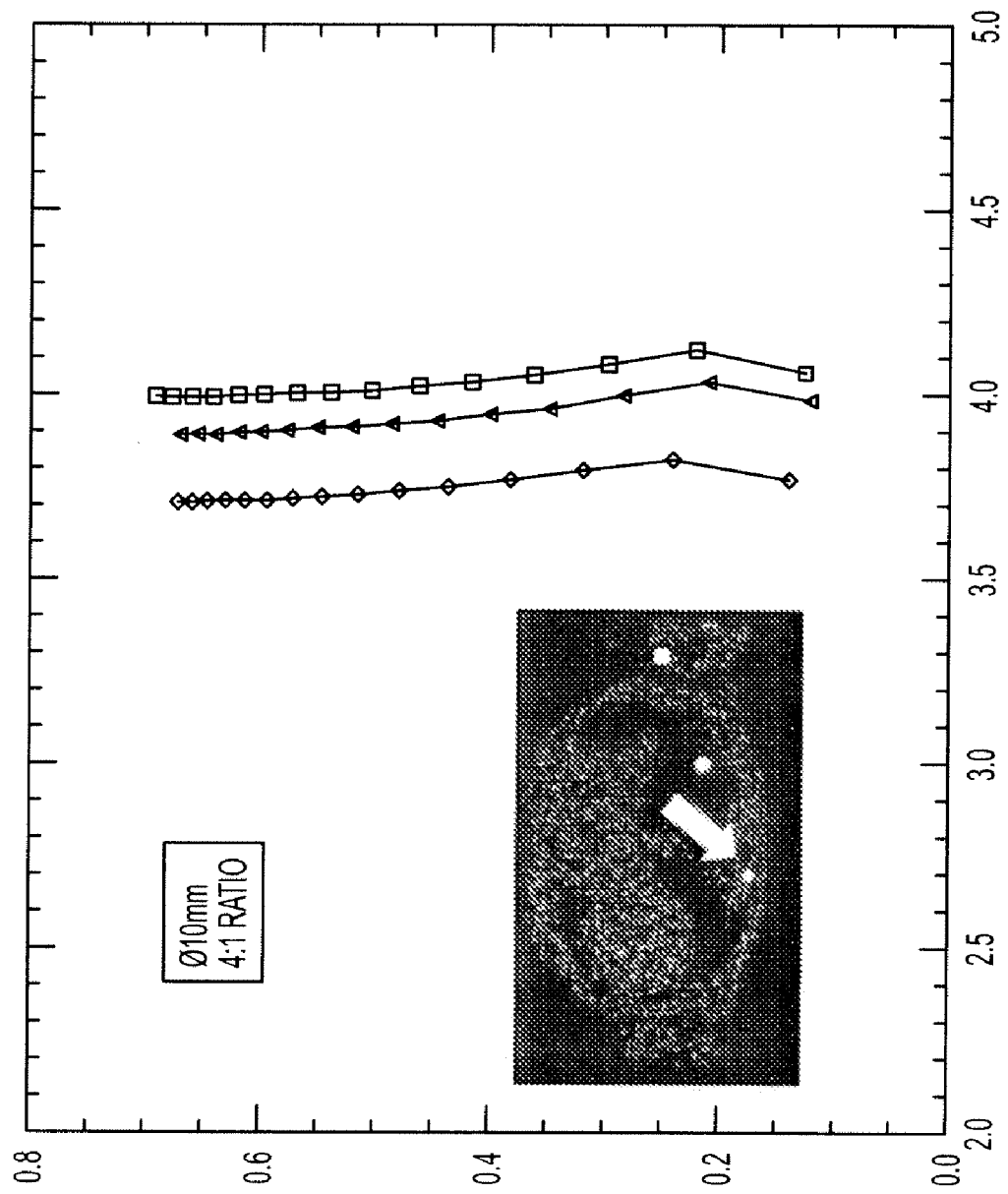

FIG. 8 is a plot of the normalized RMS difference between inverse rebinning projectors and Joseph's projector versus projection plane index. For both FIGS. 7 and 8, projection data are organized as follows: segment 0 planes 0-108, +1 109-205, −1 206-302, +2 303-377, −2 378-452, +3 453-505, −3 506-558. RMSE shows the axial period of the phantom.

A torso phantom has been generated from a CT scan. Hot spheres of various diameters were inserted in the phantom background in axial planes close to the axial center. The projection data sets were generated by Joseph's method. Poisson noise was added. Degradation factors (scatter, attenuation) were not simulated. The TOF reconstruction was performed by a 3D OS-EM method with 21 subsets and up to 15 iterations. The 3D OS-EM algorithm used three matched projector-backprojector pairs. The reconstruction with Joseph's projector is considered the gold standard. Referring to FIGS. 9A-9E, the image reconstructed with the IRB projector-backprojector pair closely resembled the image reconstructed with Joseph's projector, since the contrast in the hot sphere was not significantly reduced. In contrast, the image reconstructed with the ISSRB projector-backprojector pair had a reduced contrast. In FIGS. 9A-9E, the OS-EM reconstructions of the torso phantom are shown with up to 15 iterations and 21 subsets. The noise-resolution tradeoff curves consist of points corresponding to the 15 iterations. The horizontal axis represents sphere to background ratio values, and the vertical axis represents normalized background noise. The diameter of the spherical ROI was smaller by 2 mm than the diameter of the corresponding simulated spherical lesion.

An initial evaluation of the computation time has been performed on a 2 GHz Intel Core2 Duo computer. No hardware parallelization of the code was performed. 3D projection with IRB (ignoring the time needed to calculate the 2D projection δ=0) was about 5.6 times faster than with Joseph's projection method. IRB was about 3.1 times faster than Joseph's method for 3D oblique along with 2D direct projection.

The presently disclosed IRB projection technique, based on an exact formula, has been shown to provide accurate 3D line integral projections and is suitable for ordered subset reconstruction algorithms. The matched backprojector is easily constructed since the DFT is an orthogonal operator; see more details in the Cho 2007 reference. The non-negativity of the modeled projection data and therefore of the system matrix elements is not guaranteed by the IRB projector. This might require a modification of the commonly used OS-EM algorithm, even though an ad-hoc application of OS-EM in the form of a gradient ascent (see J. Nuyts, S. Stroobants, P. Dupont, S. Vleugels, P. Flamen, and L. Mortelmans, "Reducing Loss of Image Quality Because of the Attenuation Artifact in Uncorrected PET Whole-Body Images," *J. Nucl. Med.*, vol. 43, pp. 1054-1062, 2002) has been shown to be appropriate for the torso phantom in this work.

The IRB projector is faster when compared to the use of efficient line integral computations. One of ordinary skill in the art should understand that an acceleration mechanism could easily be implemented for the IRB projector, since it is known a priori that TOF bins of large time differences will be zero for large values of the radial coordinate. Even without such optimization and general code optimization (for example, real valued FFT and symmetries in K storage have not been used), the presently disclosed IRB projector has had good results.

FIG. 10 is a flow chart of a process according to an embodiment. After process 1000 begins, measured 3D TOF-PET data is acquired (1010) from a PET scanner. A model 3D image is preset (1020), a modeled 2D TOF sinogram is generated (1030) from the model 3D image, and a modeled 3D TOF sinogram is generated (1040) from the 2D TOF sinogram based on an exact inverse rebinning relation in Fourier space. In an embodiment, the relation is:

$$\hat{p}(\mu, v, \delta) = \sqrt{1+\delta^2} \frac{\hat{h}(\mu)}{\hat{h}(\mu\sqrt{1+\delta^2} - v\delta)} \hat{p}(\mu\sqrt{1+\delta^2} - v\delta, v, 0).$$

The model 3D image is corrected (1050) (e.g., via correction factors generated by comparing modeled and measured sinograms) based on the 3D TOF sinogram and is provided (1060) as the reconstructed nuclear medical image, at which point process 1000 ends. In an embodiment, steps from 1030 up to 1060 are repeated until correction factors are below a predetermined threshold value.

In brief (following the discussion above), a system according to presently disclosed principles provides an efficient process for 3D TOF forward projection using an exact rebinning relation in Fourier space. In the system, 2D TOF data is deconvolved with a TOF kernel in the r-z plane, where r and z are radial and axial coordinates, respectively (this is an ill-posed problem). The resulting image is convolved with TOF kernel data in an oblique direction to obtain 3D projection data. The 2D sinogram undergoes a Fourier transform with respect to radial and axial coordinates. This Fourier transform is multiplied by a combination of Fourier transforms of TOF kernel functions. This combination depends on polar angle. After inversion of the 2D transform, a 3D oblique sinogram is generated. The final equation is well-posed. The 2D Fourier transform method is an efficient method to generate oblique (3D) data from direct (2D) projection data.

The system provides, by way of non-limitation: (1) a efficient (fast) forward projector for 3D TOF iterative reconstruction; (2) forward projection that facilitates the use of TOF axial rebinning to decrease the number of polar angles; (3) forward projection that facilitates the use of TOF transaxial mashing since it is independent of azimuthal coordinates; (4) forward projection that facilitates the use of TOF ordered subset reconstruction since the approach is independent of azimuthal coordinates; and (5) improved medical image quality and image reconstruction time due to the use of exact deconvolution-convolution as a counterintuitive unexpected result.

A processor as used herein is a device for executing stored machine-readable instructions for performing tasks and may comprise any one or combination of hardware, software, and firmware. A processor may also comprise memory storing machine-readable instructions executable for performing tasks. A processor acts upon information by manipulating, analyzing, modifying, converting, or transmitting information for use by an executable procedure or an information device, and/or by routing the information to an output device. A processor may use or comprise the capabilities of, e.g., a controller or microprocessor. A processor may be electrically coupled with any other processor, enabling interaction and/or communication therebetween. A processor comprising executable instructions may be electrically coupled by being within stored executable instructions enabling interaction and/or communication with executable instructions comprising another processor. A user interface processor or generator is a known element comprising electronic circuitry or software, or a combination of both, for generating display images or portions thereof.

An executable application comprises code or machine readable instructions for conditioning the processor to implement predetermined functions, such as those of an operating system, a context data acquisition system, or other information processing system, e.g., in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen, or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instructions or device operation without user direct initiation of the activity. An object or data object comprises a grouping of data, executable instructions, or a combination of both, or an executable procedure.

The embodiments and examples set forth herein are presented to best explain the present disclosure and its practical application and to thereby enable those skilled in the art to make and utilize the present disclosure. However, those skilled in the art will recognize that the foregoing description and examples have been presented for the purpose of illustration and example only. Thus, while preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for reconstructing a nuclear medical image from time-of-flight (TOF) positron emission tomography (PET) imaging data, the method comprising:
    acquiring measured three-dimensional (3D) TOF-PET data, including direct two-dimensional (2D) projections and oblique 3D projection data, from a PET scanner, the 3D TOF-PET data represented by the following parameterization:

$$p(t, r, \phi, z, \delta) = \sqrt{1 + \delta^2} \int_{-\infty}^{\infty} dl\, h\!\left(t - l\sqrt{1+\delta^2}\right) \times f(r\cos\phi - l\sin\phi, r\sin\phi + l\cos\phi, z + l\delta);$$

presetting a model 3D image;
    generating a modeled 2D TOF sinogram from the model 3D image;
    generating a modeled 3D TOF sinogram from the 2D TOF sinogram based on the following relation in Fourier space:

$$\hat{p}(\mu, \nu, \delta) = \sqrt{1+\delta^2}\, \frac{\hat{h}(\mu)}{\hat{h}\!\left(\mu\sqrt{1+\delta^2} - \nu\delta\right)} \hat{p}\!\left(\mu\sqrt{1+\delta^2} - \nu\delta, \nu, 0\right);$$

correcting the model 3D image based on the 3D TOF sinogram; and
    providing the corrected model 3D image as the reconstructed nuclear medical image.

2. The method of claim 1, wherein correcting the model 3D image includes:
    comparing the modeled 3D TOF sinogram with the measured 3D projection data to generate a correction factor; and
    back-projecting the correction factor to correct the model 3D image.

3. The method of claim 1, wherein generating the modeled 2D TOF sinogram, generating the modeled 3D TOF sinogram, and correcting the model 3D image are repeated until a predetermined threshold correction factor has been reached.

4. The method of claim 1, wherein acquiring the 3D TOF-PET data includes storing the 3D TOF-PET data in a plurality of TOF time bins, each bin corresponding to a time difference value of photons arriving at opposite detectors of the PET scanner.

5. The method of claim 1, wherein generating the modeled 2D TOF sinogram includes computing a direct model projection as a line integral through the model 3D image including modeled TOF information.

6. The method of claim 1, wherein the relation in Fourier space is an exact inverse rebinning relation implemented in a time-axial frequency domain without temporal interpolation.

7. The method of claim 6, wherein the following approximation enables implementation without temporal interpolation:

$$\sqrt{1+\delta^2} \approx 1.$$

8. A positron emission tomography (PET) scanner comprising a gantry, an event detection unit, and a computational unit for image processing, the computational unit configured to:
    acquire measured three-dimensional (3D) TOF-PET data, including direct two-dimensional (2D) projections and oblique 3D projection data, from a PET scanner, the 3D TOF-PET data represented by the following parameterization:

$$p(t, r, \phi, z, \delta) = \sqrt{1 + \delta^2} \int_{-\infty}^{\infty} dl\, h\!\left(t - l\sqrt{1+\delta^2}\right) \times f(r\cos\phi - l\sin\phi, r\sin\phi + l\cos\phi, z + l\delta);$$

preset a model 3D image;
    generate a modeled 2D TOF sinogram from the model 3D image;
    generate a modeled 3D TOF sinogram from the 2D TOF sinogram based on the following relation in Fourier space:

$$\hat{p}(\mu, \nu, \delta) = \sqrt{1+\delta^2}\, \frac{\hat{h}(\mu)}{\hat{h}\!\left(\mu\sqrt{1+\delta^2} - \nu\delta\right)} \hat{p}\!\left(\mu\sqrt{1+\delta^2} - \nu\delta, \nu, 0\right);$$

correct the model 3D image based on the 3D TOF sinogram; and
    provide the corrected model 3D image as the reconstructed nuclear medical image.

9. The PET system of claim 8, wherein the system is configured to correct the model 3D image by:
    comparing the modeled 3D TOF sinogram with the measured 3D projection data to generate a correction factor; and
    back-projecting the correction factor to correct the model 3D image.

10. The PET system of claim 8, wherein the computational unit is configured to generate the modeled 2D TOF sinogram, generate the modeled 3D TOF sinogram, and correct the model 3D image repetitively until a predetermined threshold correction factor has been reached.

11. The PET system of claim 8, wherein the computational unit is configured to acquire the 3D TOF-PET data by storing the 3D TOF-PET data in a plurality of TOF time bins, each bin corresponding to a time difference value of photons arriving at opposite detectors of the PET scanner.

12. The PET system of claim 8, wherein the computational unit is configured to generate the modeled 2D TOF sinogram by computing a direct model projection as a line integral through the model 3D image including modeled TOF information.

13. The PET system of claim 8, wherein the relation in Fourier space is an exact inverse rebinning relation implemented in a time-axial frequency domain without temporal interpolation.

14. The PET system of claim 13, wherein the following approximation enables implementation without temporal interpolation:

$$\sqrt{1+\delta^2} \approx 1.$$

15. A non-transitory computer readable medium having instructions stored thereon, the instructions when executed by a processor causing the processor to perform the operations of:

acquiring measured three-dimensional (3D) TOF-PET data, including direct two-dimensional (2D) projections and oblique 3D projection data, from a PET scanner, the 3D TOF-PET data represented by the following parameterization:

$$p(t, r, \phi, z, \delta) = \sqrt{1+\delta^2}$$
$$\int_{-\infty}^{\infty} dl\, h(t - l\sqrt{1+\delta^2}) \times f(r\cos\phi - l\sin\phi, r\sin\phi + l\cos\phi, z + l\delta);$$

presetting a model 3D image;

generating a modeled 2D TOF sinogram from the model 3D image;

generating a modeled 3D TOF sinogram from the 2D TOF sinogram based on the following relation in Fourier space:

$$\hat{p}(\mu, \nu, \delta) = \sqrt{1+\delta^2}\, \frac{\hat{h}(\mu)}{\hat{h}(\mu\sqrt{1+\delta^2} - \nu\delta)} \hat{p}(\mu\sqrt{1+\delta^2} - \nu\delta, \nu, 0);$$

correcting the model 3D image based on the 3D TOF sinogram; and providing the corrected model 3D image as a reconstructed nuclear medical image.

16. The non-transitory computer readable medium of claim 15, wherein correcting the model 3D image includes:

comparing the modeled 3D TOF sinogram with the measured 3D projection data to generate a correction factor; and back-projecting the correction factor to correct the model 3D image.

17. The non-transitory computer readable medium of claim 15, wherein generating the modeled 2D TOF sinogram, generating the modeled 3D TOF sinogram, and correcting the model 3D image are repeated until a predetermined threshold correction factor has been reached.

18. The non-transitory computer readable medium of claim 15, wherein acquiring the 3D TOF-PET data includes storing the 3D TOF-PET data in a plurality of TOF time bins, each bin corresponding to a time difference value of photons arriving at opposite detectors of the PET scanner.

19. The non-transitory computer readable medium of claim 15, wherein generating the modeled 2D TOF sinogram includes computing a direct model projection as a line integral through the model 3D image including modeled TOF information.

20. The non-transitory computer readable medium of claim 15, wherein the relation in Fourier space is an exact inverse rebinning relation implemented in a time-axial frequency domain without temporal interpolation.

* * * * *